United States Patent [19]

Bray

[11] 4,240,190

[45] Dec. 23, 1980

[54] SPECIALTY HAND TOOL

[76] Inventor: Ross N. Bray, 217 N. Main St., Lamar, Colo. 81052

[21] Appl. No.: 68,675

[22] Filed: Aug. 22, 1979

[51] Int. Cl.[3] .......... B23P 19/04; B25B 7/00

[52] U.S. Cl. .......... 29/268; 81/5.1 R; 81/419

[58] Field of Search .......... 29/268; 81/5.1 R, 419, 81/425 R, 425 A

[56] References Cited

U.S. PATENT DOCUMENTS

| | | | |
|---|---|---|---|
| 1,248,923 | 12/1917 | Ryczek | 81/5.1 R X |
| 1,346,306 | 7/1920 | Duket | 81/419 X |
| 1,678,313 | 7/1928 | Atkinson | 29/268 X |
| 2,111,106 | 3/1938 | Tinnerman | 81/5.1 R |
| 2,277,081 | 3/1942 | Dehillo | 81/419 |
| 2,328,866 | 9/1943 | Van Sittert et al. | 81/5.1 R |
| 2,342,479 | 2/1944 | Miles et al. | 81/5.1 R |
| 2,353,843 | 7/1944 | Miles et al. | 81/5.1 R X |
| 2,354,480 | 7/1944 | Rossmann | 81/5.1 R |
| 2,584,433 | 2/1952 | Diepen | 81/5.1 R X |
| 2,601,117 | 6/1952 | Graham | 81/5.1 R X |
| 2,755,541 | 7/1956 | Kruger | 81/5.1 R X |

*Primary Examiner*—James G. Smith
*Attorney, Agent, or Firm*—Burton & Dorr

[57] ABSTRACT

A specialty hand tool primarily for removing upholstery trim buttons from their spring steel retainers in an efficient and effective manner without destroying the ability of the retainers to be reused immediately. The tool has two elongated members pivotally mounted to each other in a general plier configuration. One of the opposing jaw members of the tool has a substantially flat surface with a dimple therein for engaging the apex of the trim button stud. The second jaw member is bifurcated into two, free-standing portions which straddle the shaft of the trim button stud. The second jaw members has first and second generally U-shaped edges of different sizes which are spaced from each other with the larger of the two edges being positioned closer to the first jaw member. An inclined surface extends between the two U-shaped edges giving the second jaw member an overall appearance of a horseshoe-shaped or open-ended sport's arena when viewed head on. The second jaw member also includes serrated sections, diverging edges, wedge-shaped ends on each of the bifurcated portions, and a distinctive neck portion so that the bifurcated portions can be inserted between the back of the trim button and the underside of the retainer without any interference from the rim portion of the retainer.

8 Claims, 8 Drawing Figures

SPECIALTY HAND TOOL

FIELD OF THE INVENTION

This invention relates to the field of hand tools and more particularly to the field of specialty hand tools primarily designed for use with upholstery, trim buttons.

BACKGROUND OF THE INVENTION AND PRIOR ART

Most specialty tools are designed to solve a specific problem in a specific situation. Examples of U.S. patents for such tools are: U.S. Pat. No. 1,248,923 to Ryzcek for a tool for removing pop bottle tops; U.S. Pat. No. 1,346,306 to Duket for a pair of pliers for removing the terminals of a storage battery; U.S. Pat. No. 1,678,313 to Atkinson for an automobile battery tool; U.S. Pat. No. 2,111,106 to Tinnerman for a tool for applying threadless sheet metal nuts on bolts; U.S. Pat. No. 2,328,866 to Van Sittert for a pair of pliers used to apply and remove plate holders during riveting operations; U.S. Pat. No. 2,342,479 to Miles for a tool to apply spring steel fasteners to shingle securing nails; U.S. Pat. No. 2,353,848 to Miles for a tool to apply spring steel fasteners to shingle securing nails; U.S. Pat. No. 2,584,433 to Diepen for an eyeglass frame holder; U.S. Pat. No. 2,601,117 to Graham for a tool to apply and remove extension devices for temporary rivets; U.S. Pat. No. 2,700,910 to Van Niel for a pivoted jaw spring nut remover; and U.S. Pat. No. 2,755,541 to Kruger for a plier tool to apply and remove sheet metal fasteners. Although the range of use of such specialty tools is often very narrow and their cost sometimes relatively high, specialty tools more often than not pay for themselves many times over in terms of increased efficiency, increased safety to the operator of the tool, and reduction in damage to the parts being worked.

Efficiency, safety to the operator, and reduction in damage to the parts being worked are especially important in the field of removing and replacing upholstery, trim buttons as when the upholstery in an automobile is repaired or replaced. Current upholstery, trim buttons generally have an upstanding stud extending from the back of the button. The stud has an enlarged head or burr on it and the button is retained in place by inserting the stud head through a hole in a spring steel retainer. The retainer has slits extending outwardly of the hole forming a plurality of resilient ears or sections which flex outwardly as the head of the stud passes through the hole and then resiliently snap back to prevent the stud head from passing back through the hole. This manner of mounting trim buttons is very efficient and effective; however, present methods of removing such buttons as when the upholstery is repaired or replaced are extremely inefficient and ineffective. Specifically, one of the most common ways of removing the retainer is to pry one or more of the resilient ears away from the stud with a sharp, pointed instrument such as an ice pick. This method is very time consuming, relatively dangerous to the operatore, and usually ruins the retainer for reuse because one or more of the ears are bent out of alignment with the other ears. To again properly retain the trim button, the bent ear or ears must be hammered back into proper alignment or else a new retainer used. Needless to say, this realignment of the ears or complete replacement of the retainer can become very time consuming and costly in an upholstery job involving a dozen or more trim buttons. Replacement is a particular problem because the retainers are usually custom designed to match the shape of the trim button which often can be very unique. Consequently, with the present removal methods which tend to destroy the retainer, either a costly inventory of retainers must be kept on hand or replacements ordered as needed resulting in significant delays. Further, it is often the case that a replacement retainer for a uniquely shaped trim button is simply not available from any source.

There clearly exists the need for a specialty tool in the upholstery field to effectively and safely remove trim buttons from their spring steel retainers without damaging the retainers or impairing the ability of the retainers to be reused immediately. The specialty tool of the present invention is designed to meet this need and to do so in a simple, effective, efficient, and relatively inexpensive manner.

SUMMARY OF THE INVENTION

The present invention involves a specialty tool for removing upholstery, trim buttons from their retainers in an efficient and effective manner without destroying the ability of the retainers to be reused immediately. The trim buttons with which the present invention are primarily intended to be used have at least one stud upstanding from the back of the button. The stud has a cylindrical shaft with an enlarged head or burr on it and the button is retained in place by inserting the stud head through a hole in a spring steel retainer. The retainer has slits extending outwardly of the hole forming a plurality of resilient ears or sections which flex outwardly as the head of the stud passes through the hole and then resiliently snap back to prevent the stud head from passing back through the hole.

The specialty tool of the present invention has an overall plier configuration in which a pair of elongated members are pivotally mounted to each other with corresponding end portions of the two members forming opposing jaws. One jaw member has a substantially flat surface with a dimple or recess therein designed to receive the top of the stud head and the other jaw member is bifurcated into two, free standing portions designed to straddle the shaft of the stud. The bifurcated portions have first, corresponding edges which together form a first U-shape extending outwardly of the pivotal axis of the tool. A surface extends outwardly of this first, U-shaped edge and is inclined toward the flat surface of the first jaw member when the two jaw members are in a closed, substantially abutting position. This inclined surface terminates in a second, U-shaped edge of larger dimension than the first and spaced closer to the flat surface of the first jaw member than the first U-shaped edge.

In operation, the tool is first positioned with the stud shaft between the bifurcated portions of the second jaw member and with the dimpled surface of the first jaw member abutting the top of the head of the stud. The two jaw members are then moved toward each other wherein the rsilient ears or sections of the retainer abut against the larger, second U-shaped edge while the base of the enlarged head of the stud presses against and flexes the resilient ears of the retainer toward the inclined surface of the second jaw member. The ears are flexed until the base of the stud head passes through the hole in the retainer whereupon the ears resiliently snap back to their original position. Because of the inclined surface of the second jaw member and the relative spacing and size of the two, U-shaped edges, the ears of the retainer are able to resiliently flex pretty much as they wish as the stud is removed. Consequently, the ears are not bent or otherwise inhibited from returning to their original position ready for immediate reuse.

Other features of the specialty tool of the present invention include a distinctive neck on which the bifurcated portions of the second jaw member are supported. Since trim button retainers typically have a rim portion from which the resilient ears are recessed and since trim button studs typically are placed inwardly of the button's periphery, the neck support enables the bifurcated portions to be easily and quickly manipulated to straddle the stud shaft between the back of the trim button and the recessed portion of the retainer. The specialty tool of the present invention also has a serated section on the second jaw member for better gripping of the retainer during removal of the stud. Still other features that add to the efficient operation of the tool are wedge-shaped tips on the ends of the bifurcated portions and outwardly diverging edges near these tips. The wedge-shaped tips serve to facilitate the insertion of the bifurcated portions between the back of the trim button and the recessed portion of the retainer and the diverging edges serve to facilitate the proper alignment of the stud shaft between the bifurcated portions.

OBJECTS OF THE INVENTION

It is the principal object of this invention to provide a specialty hand tool for efficiently and effectively removing upholstery, trim buttons from their spring steel retainers without damaging the retainers or impairing the ability of the retainers to be reused immediately.

Another object of this invention is to provide a specialty hand tool for removing upholstery, trim buttons from their retainers wherein the tool is easy to manipulate and use, simple in design, durable, and relatively inexpensive.

Additional objects as well as features and advantages of this invention will become evident from the descriptions set forth hereinafter when considered in conjunction with the accompanying drawings.

BRIEF DESCRIPTION OF THE DRAWINGS

FIG. 6 also icludes a showing of the positioning of the upholstery relative to the trim button and retainer.

DETAILED DESCRIPTION OF PREFERRED EMBODIMENTS

Figure 1:
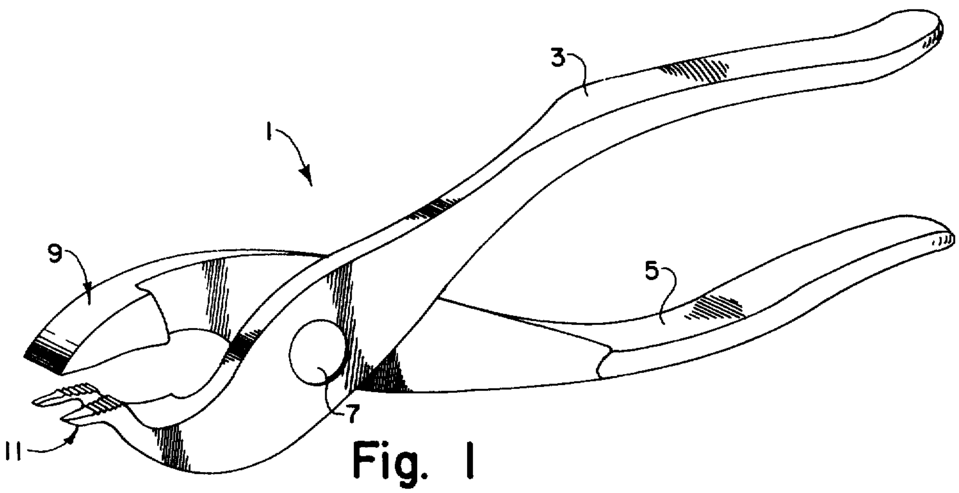
FIG. 1 is a perspective view of the specialty hand tool of the present invention.
Figure 2:
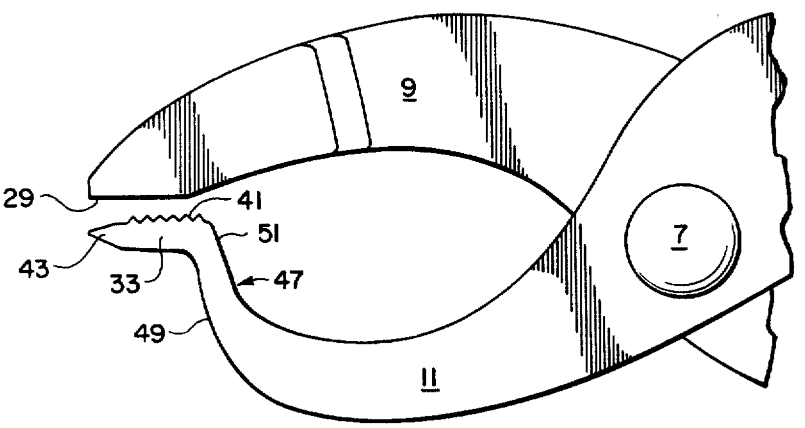
FIG. 2 is a side view of the tool illustrating the opposing jaw members thereof.
Figure 3:
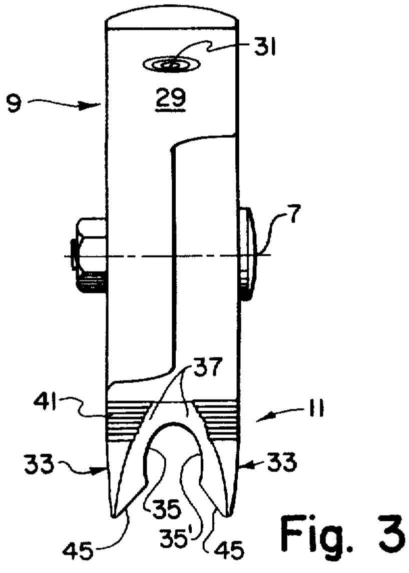
FIG. 3 is a front view of the opposing jaw members of the tool shown in their open position and illustrating details of the jaw members.
Figure 4:
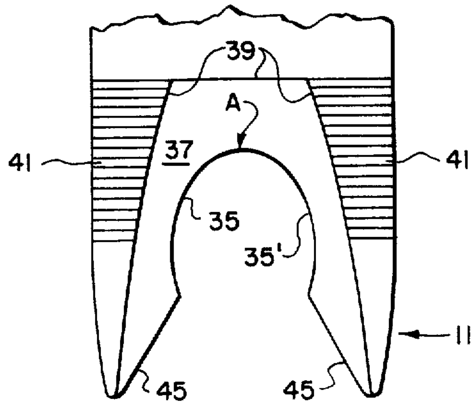
FIG. 4 is an enlarged, top view of the second jaw member showing details of the bifurcated portions thereof.
Figure 5:
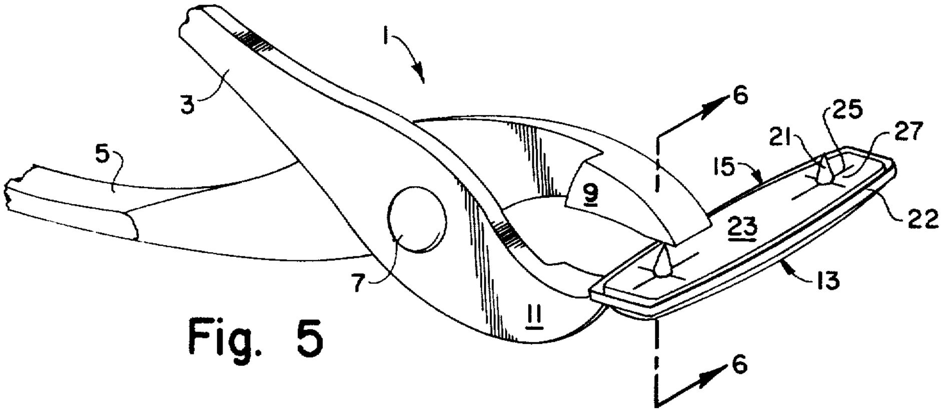
FIG. 5 is a top perspective view of the specialty tool of the present invention positioned to remove a trim button from its spring steel retainer. For clarity, the upholstery is not shown in this view.
Figure 6:
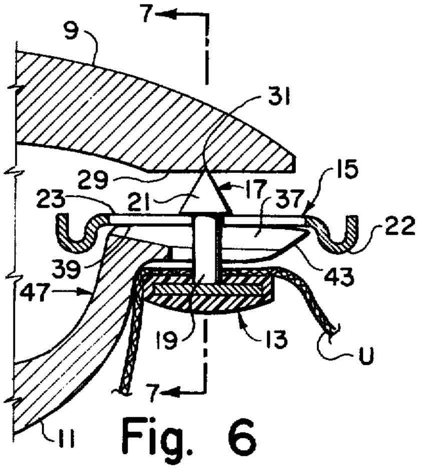
FIG. 6 is a view along line 6—6 of FIG. 5 illustrating the preferred positioning of the first and second jaw members relating to the trim button and spring steel retainer.
Figure 7:
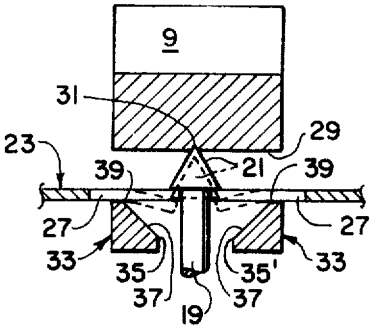
FIG. 7 is a cross-sectional view along line 7—7 of FIG. 6 with some parts not shown in order to more clearly illustrate the manner in which the stud on the back of the trim button is removed from the spring steel retainer. As shown in dotted lines in FIG. 7, the resilient ears or sections of the spring steel retainer are permitted to flex pretty much as they wish toward the inclined surface of the second jaw member of the tool as the stud is removed.

As illustrated in FIGS. 1 and 2, the specialty hand tool 1 of the present invention has an overall plier configuration in which elongated members 3 and 5 are pivotally mounted to each other at 7 with their corresponding end portions forming opposing jaw members 9 and 11. In the fashion of a plier-type tool, the jaw members 9 and 11 are movable between an open position as illustrated in FIG. 3 and a closed position in which the jaw members 9 and 11 abut or substantially abut one another. The hand tool 1 is specially designed for use in removing upholstery, trim buttons 13 from their spring steel retainers 15 (see FIG. 5–7) in an efficient and effective manner without destroying the ability of the retainers 15 to be reused immediately. The typical trim button 13 in FIG. 5 with which the specialty hand tool 1 of the present invention is primarily intended to be used has at least one stud 17 extending from the back of it. The stud 17 has a cylindrical shaft 19 with an enlarged head or burr 21 on it. The head or burr 21 has a substantially conical shape with the base of the cone extending outwardly of the shaft 19 for a first distance giving the stud 13 an overall shape substantially resembling an arrow. The spring steel retainer 15 typically has a rim portion 22 and a recessed, resilient portion 23 (see FIGS. 5, 6, and 7) with at least one substantially circular hole therethrough of slightly smaller diameter than the width of the base of the cone-shaped head 21 of the stud 17. The retainer 15 has slits extending outwardly of the hole or holes therethrough defining edges 25 and forming a plurality of resilient ears or sections 27 (see FIGS. 5 and 8). The resilient sections 27 are inherently biased toward a first position with adjacent edges 25 substantially aligned with each other as illustrated in FIG. 5–7. In use, stud head 21 is pushed through the hole in the retainer 15 flexing the resilient sections 27 outwardly until the stud head 21 passes through the hole wherein the sections 27 resiliently snap back to their first, aligned position to prevent the stud head 21 from passing back through the hole.

Figure 8:
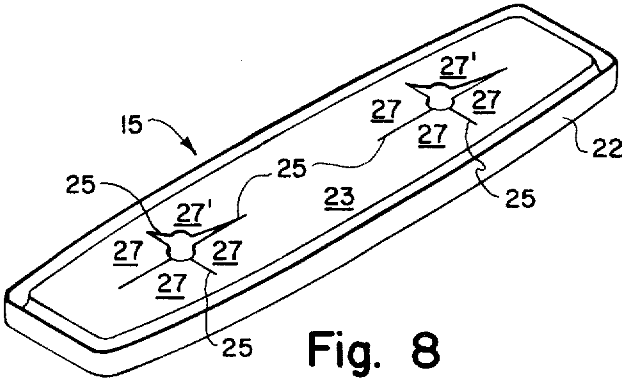
Fig. 8 PRIOR ART
FIG. 8 is a top perspective view of a damaged, prior art retainer with one ear at each hole bent away from its proper alignment. Such damage is a result of current methods used to remove the trim buttons from their retainers wherein typically an ice pick or other pointed instrument is used to pry one of the resilient ears at each hole away from its preferred position in alignment with the other ears.

FIG. 8 shows a damaged prior art retainer 15 in which one section 27' at each hole has been bent out of alignment with the others. This is a result of present methods of removing trim buttons 13 from retainers 15 wherein an ice pick or other pointed instrument is used to pry one ear or section 27' out of alignment with the others so that the stud head 21 can pass through the hole. In most cases, the damaged retainer 15 of FIG. 8 cannot be reused or at least be effectively reused until the bent section 27' is again aligned with the other sections 27 as for example by hammering it back into alignment. The specialty hand tool 1 of the present invention is specifically designed to overcome this problem and enable the button 13 to be removed from the retainer 15 without damaging any of the sections 27 and without destroying the ability of the retainer 15 to be reused immediately.

Referring to FIG. 1–7, the first jaw member 9 of the tool 1 has a substantially flat, first surface 29 which preferably has a dimple or recess 31 therein for engaging the apex of the cone-shaped stud head 21 as best seen in FIGS. 3, 6, and 7. The second jaw member 11 of the tool 1 is bifurcated into two, free-standing portions 33 which extend outwardly of the pivotal axis 7 of the elongated members 3 and 5. The portions 33 have corresponding first edges 35 and 35' which extend outwardly from a substantially common location A in FIG. 4 and which together form a first, generally U-shaped. The edges 35 and 35' are substantially co-planer. The surface 37 in FIGS. 3, 4, and 7 intersects and extends outwardly of the first edges 35 and 35' substantially along the entire length of the first U-shape. The surface 37 is inclined toward the first jaw member 9 when the two jaw members 9 and 11 are in their closed position as best seen in FIG. 7. The inclined surface 37 terminates in a second, generally U-shaped edge 39 of larger dimension than the first U-shaped edge formed by 35 and 35'. Like the first U-shaped edge, the second U-shaped edge 39 is substantially co-planer and the plane of the first and second U-shaped edges are substantially parallel to each other. The second U-shaped edge 39 is positioned closer to the first surface 29 of the first jaw member 9 than the first U-shaped edge of 35 and 35' when the jaw members 9 and 11 are in their closed position. When viewed from the left of FIG. 2, the first and second U-shaped edges and inclined surface 37 extending therebetween have an overall appearance somewhat similar to a horseshoe-shaped or open-ended sport's arena.

The second jaw member 11 also has several other features specially designed to further facilitate the removal of stud 13 from the retainer 15 without damaging the retainer 15. Specifically, serrated sections 41 are provided on each of the bifurcated portions 33 for better gripping of the retainer 15; and, the ends 43 of each of the bifurcated portions 33 are wedged-shaped when viewed along the pivotal axis 7 in FIGS. 2 and 6 to facilitate the insertion of the bifurcated portions 33 between the back of the trim button 13 and the resilient, recessed portion 23 of the retainer 15. The second jaw member 11 also has diverging edges 45 in FIGS. 3 and 4 which extend between the tips of the first and second U-shaped edges so that the stud shaft 19 will be guided into position between the bifurcated portions 33 as the second jaw member 11 is moved toward the stud shaft 19. Further, the second jaw member 11 has a support section extending from the pivotal axis 7 to the bifurcated portions 33 wherein the support section has a distinctive neck portion 47 with front and back surfaces 49 and 51 extending substantially parallel to each other and to the pivotal axis 7. These front and back surfaces 49 and 51 extend away from the planes of the first (35 and 35') and second (39) U-shaped edges at substantially 90° angles and also away from the substantially flat, first surface 29 of the first surface jaw member 9 at substantially 90° angles when the jaw members 9 and 11 are in their closed position. The spacing between the front and back surfaces 49 and 51 of the neck portion 47 is substantially the same as the spacing between the parallel planes of the first and second U-shaped edges. The distinctive neck portion 47 enables the bifurcated portion 33 to be easily and quickly manipulated to straddle the stud shaft 19 between the back of the trim button 13 and the recessed portion 23 of the retainer 15 without letting the rim portion 22 of the retainer 15 interfere with the positioning of the second U-shaped edge 39 in a substantially flush, abutting relationship with the underside of the recessed portion 23 of the retainer 15 as best seen in FIGS. 6 and 7.

In operation to remove the trim button 13 from its retainer 15, the specialty hand tool 1 is first manipulated to the position shown in FIGS. 5 and 6. This is accomplished by first inserting the wedge-shaped ends 43 of the bifurcated portions 33 of the second jaw member 11 between the back of the trim button 13 and the underside of the retainer 15. As this is done and as the tool 1 is moved to the position shown in FIG. 6, the diverging edges 45 in FIGS. 3 and 4 guide the stud shaft 19 to a position between the bifurcated portions 33. Also, the upholstery U is pushed out of the way so that the second, U-shaped edge 39 can abut the underside of sections 27 of the retainer 15 as the jaw members 9 and 11 are moved together (see FIGS. 6 and 7). As best seen in FIG. 7, continued closing of the jaw members 9 and 11 causes the base of the cone-shaped head 21 of the stud 17 to press against and flex the resilient sections or ears 27 toward the inclined surface 37 of the second jaw member 11. The sections 27 are flexed until the base of the stud head 21 passes through the hole in the retainer 15 whereupon the sections 27 resiliently snap back to their original, aligned position ready for reuse. Because of the inclined surface 37 of the second jaw member 11 and the respective spacing and size of the first (35 and 35') and second (39) U-shaped edges, the sections 27 of the retainer 15 are able to resiliently flex pretty much as they wish as the stud 17 is removed. Consequently, the sections 27 are not bent or otherwise inhibited from returning to their original, aligned position ready for immediate reuse. Preferably, the stud shaft 19 is positioned intermediate the bifurcated portions 33 as illustrated in FIG. 7 but even if it abuts anywhere along the first U-shaped edge (35 and 35'), there still is enough space to permit the resilient sections 27 to flex pretty much as they wish and without damage as the stud 17 is removed. The dimple 31 in the surface 29 of the first jaw member 9 is intended to engage the apex of the stud head 21 so that the force applied to the stud 17 as the tool 1 is closed is substantially axially therealong.

While several embodiments of the present invention have been described in detail herein, it is to be understood that changes and modifications can be made without departing from the scope of the invention.

I claim:

1. A plier tool primarily for use in removing a stud retainer from about a stud on a trim button, said stud having a substantially cylindrical shaft upstanding from said trim button with a substantially cone-shaped head atop thereof, the base of said cone-shaped head extending outwardly of said shaft for a first distance giving the stud an overall shape substantially resembling an arrow, said stud retainer having a resilient portion with a substantially circular hole therethrough of slightly smaller diameter than the width of the cone-shaped head at the base thereof, said resilient portion of said stud retainer having slits extending outwardly of said hole forming a plurality of resilient sections inherently biased toward a first position with adjacent edges of adjacent sections substantially aligned with each other, said stud being retained in said stud retainer by inserting said cone-shaped head into and through said hole in a first direction whereby said resilient sections adjacent said hole are first flexed slightly away from said first position in said first direction and then resiliently snap back to said first position as the base of said cone-shaped head passes through said hole wherein said cone-shaped head cannot pass freely through said hole in a second direction opposite to said first direction while said resilient sections are in said position, said plier tool comprising:

a pair of elongated members having respective first and second end portions and means for mounting said pair of members to each other between said respective end portions for pivotal movement relative to each other about an axis with said respective first end portions forming opposing first and second jaw members, said pair of members being movable between an open position with said jaw members spaced from each other and a closed position with said jaw members substantially abutting one another, said first jaw member having a first surface for engaging the apex of said cone-shaped head of said stud, and said second jaw member being bifurcated into two, free standing portions extending in directions outwardly of said pivotal axis, each of said two portions having a corresponding first edge extending outwardly of said pivotal axis from a substantially common location and together forming a first, generally U-shape with said common location being at the base of said first U-shape, said first U-shape being dimensioned to pass the base of said cone-shaped head of said stud therethrough, said second jaw member further having a surface intersecting and extending outwardly of said first edges substantially along the entire length of said first U-shape, said surface being inclined toward said first jaw member when said jaw members are in said closed, substantially abutting position, said inclined surface terminating in a second edge having a second, generally U-shape of larger dimension than said first U-shape, said second U-shaped edge being positioned closer to said first surface of said first jaw member than said first U-shaped edge when said jaw members are in said closed position whereby said jaw members in said open position can be positioned with said stud shaft between said two, free standing portions of said second jaw member and said first surface of said first jaw member abutting the apex of said cone-shaped head of said stud and said jaw members can then be moved toward said closed position wherein said resilient sections of said stud retainer abut against said larger, second U-shaped edge while the base of said cone-shaped head of said stud presses against and flexes said resilient sections immediately adjacent said hole toward said inclined surface of said second jaw member and away from said first position in said second direction opposite to said first direction until the base of said cone-shaped head passes through said hole and said resilient sections snap back to said first position thereby releasing said stud from said stud retainer.

2. The plier tool of claim 1 wherein said first edges extend in a substantially common plane and said second edge extends substantially in a second plane parallel to said common plane of said first edges and spaced therefrom in a direction toward said first surface of said first jaw member when said jaw members are in said closed position.

3. The plier tool of claim 1 wherein said first surface of said first jaw member is substantially planar, said two, free standing portions of said second jaw member extend outwardly of said pivotal axis substantially between two spaced-apart planes parallel to each other and said pivotal axis, and said second jaw member further includes a support section extending between said two, free-standing portions and said pivotal axis, said support section including a neck portion immediately adjacent said two, free standing portions, said neck portion having front and back surfaces substantially parallel to each other and said pivotal axis and extending away from said spaced-apart planes at substantially 90° angles and away from said first surface of said first jaw member at substantially 90° angles when said jaw members are in said closed position.

4. The plier tool of claim 3 wherein the spacing between said two spaced-apart planes and the spacing between said front and back surfaces of said neck portion are substantially equal.

5. The plier tool of claim 1 wherein said two, free standing portions of said second jaw member further have corresponding edges respectively extending outwardly from the tips of said first U-shape and diverging from each other in a direction away from said pivotal axis whereby said stud shaft is guided to a position between said two, free standing portions as said second jaw member is moved toward said stud shaft.

6. The plier tool of claim 1 wherein said second jaw member has at least one serrated section extending outwardly of at least a part of said second U-shaped edge substantially in said second plane whereby the second jaw member is able to grip better the stud retainer during removal of the stud.

7. The plier tool of claim 1 wherein the stud has an axis of symmetry and the force applied to the stud as the jaw members are moved toward said closed position is substantially along said axis and wherein the first surface of said first jaw member has a small dimple therein to receive better the apex of said cone-shaped head of said stud and to maintain better the axial alignment of said applied force as the jaw members are moved toward said closed position.

8. The plier tool of claim 1 wherein each of said two, free standing portions of said second jaw member tapers down in a direction away from said pivotal axis to form a substantially wedge-shape when viewed along said pivotal axis.

* * * * *